United States Patent [19]
Pentlicki

[11] 4,133,501
[45] Jan. 9, 1979

[54] SELF-DEPLOYABLE SOLAR CELL PANEL

[75] Inventor: Chester J. Pentlicki, Gaithersburg, Md.

[73] Assignee: Communications Satellite Corporation, Washington, D.C.

[21] Appl. No.: 769,805

[22] Filed: Feb. 17, 1977

Related U.S. Application Data

[63] Continuation of Ser. No. 620,007, Sep. 30, 1975, abandoned.

[51] Int. Cl.² .............................................. B64G 1/10
[52] U.S. Cl. ................................ 244/173; 136/89 SA
[58] Field of Search ................. 244/173, 158; 16/180, 16/182, 189, 190; 292/213–218; 136/89 SA

[56] References Cited

U.S. PATENT DOCUMENTS

| | | | |
|---|---|---|---|
| 1,532,441 | 4/1925 | Ragsdale | 292/218 |
| 3,258,225 | 6/1966 | Esch et al. | 244/258 |
| 3,510,086 | 5/1970 | Arbeitlang et al. | 244/173 |
| 3,559,919 | 2/1971 | Sass | 244/173 |

OTHER PUBLICATIONS

Corbett et al., "Lightweight Rigid Solar Array Structural Considerations", Conf. Record, 11th IEEE Photospecialist Conf., 5/6-8/1975, pp. 103-109.
"Fleet Satellite Communications System Spacecraft", TRW, 2/1/1974.
Abbott, "Lightweight Large Area Solar Arrays", Proceedings of the H Intersociety Energy Conversion Engineering Conf, Wash., D.C. 9/22-26/1969, pp. 772-777.

Primary Examiner—Barry L. Kelmachter
Attorney, Agent, or Firm—Sughrue, Rothwell, Mion, Zinn and Macpeak

[57] ABSTRACT

A pair of semi-rigid solar cell panels are curved under stress and latched in arcuate edge abutting fashion about the exterior of a spacecraft body, and upon release of the latched ends flatten into tangency at opposite sides of the spacecraft body. Spring hinges at the ends of a deployment arm cause each panel to automatically move radially outward of the spacecraft body, and a motor mounted to the spacecraft body and to one end of the deployment arm rotates the panel to orient the solar cells relative to the source of solar energy.

10 Claims, 9 Drawing Figures

U.S. Patent  Jan. 9, 1979  Sheet 1 of 2  4,133,501
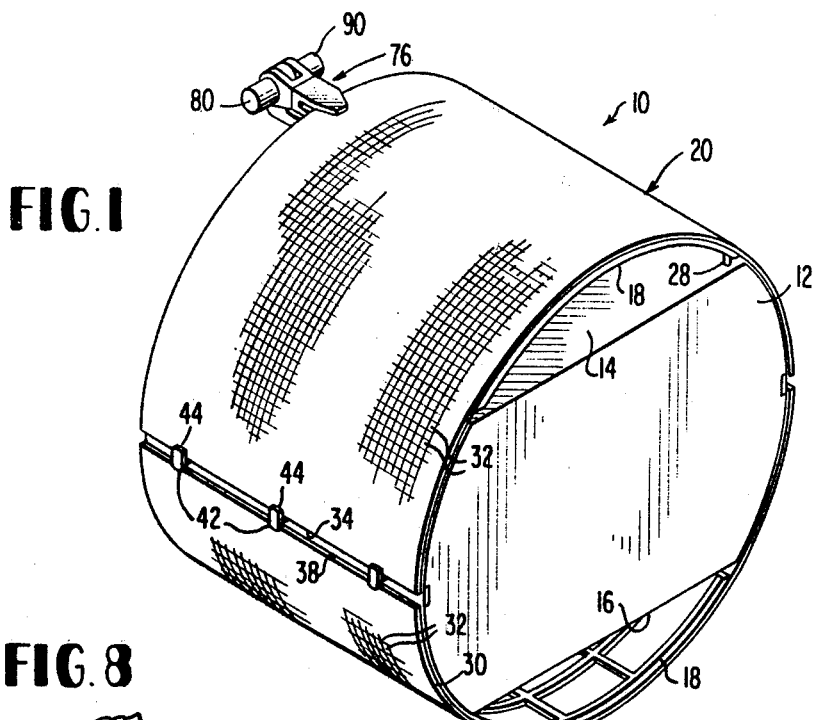
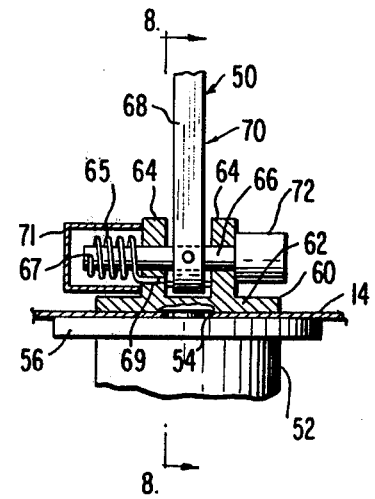
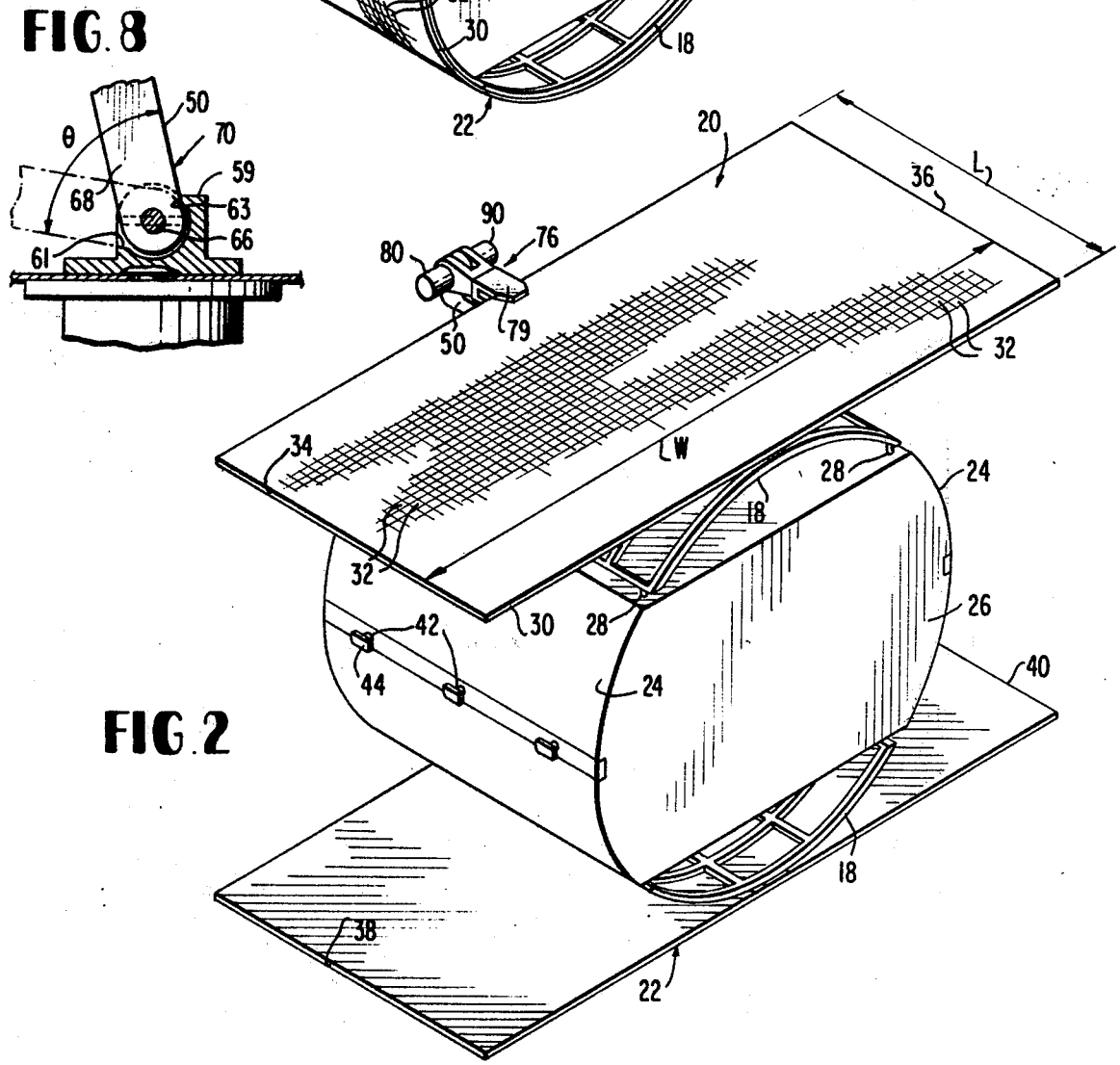

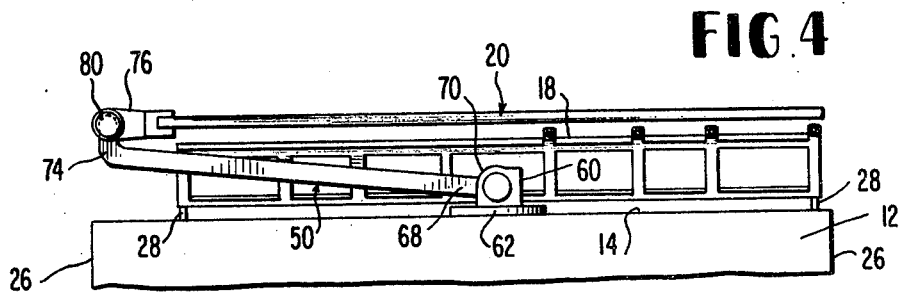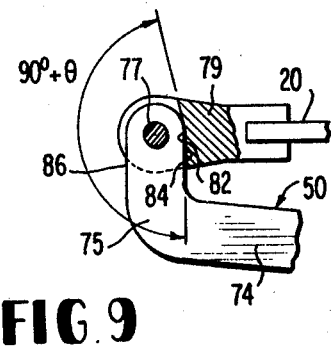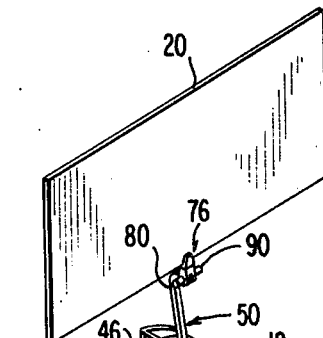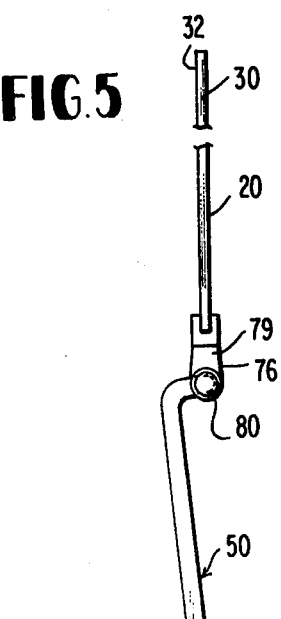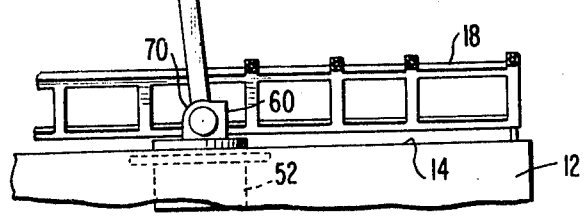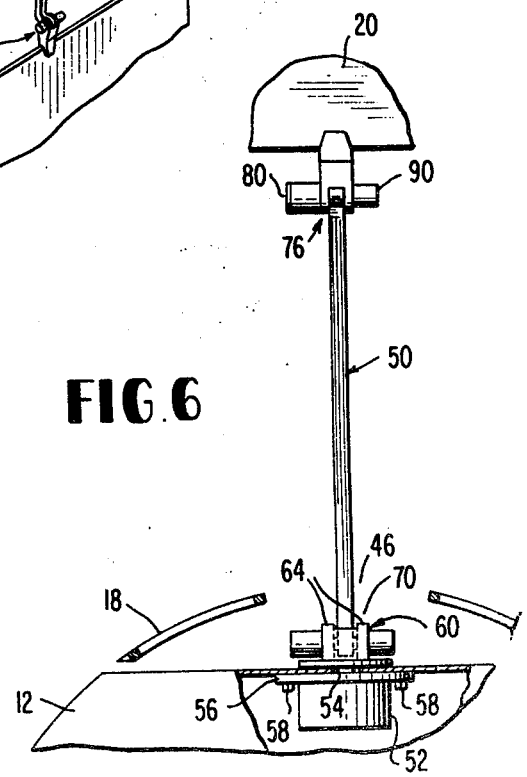

SELF-DEPLOYABLE SOLAR CELL PANEL

This is a continuation of application Ser. No. 620,007 filed Sept. 30, 1975 now abandoned.

BACKGROUND OF THE INVENTION

1. Field of the Invention

This invention relates to deployable solar cell arrays, and more particularly to a semi-rigid solar cell panel whose width when deployed is in excess of the width of the spacecraft which stores the panels during launch.

2. Description of the Prior Art

There have been a variety of mechanical configurations proposed for deployable solar arrays. The various configurations fall into two general classes; rigid substrate and flexible substrate. The substrate is the structural element to which the rather fragile solar cells are affixed. In the case of the rigid substrate type of solar arrays, the structural element is usually formed of honeycombed material, and it is necessarily designed to be sufficiently rigid so that it is self-supporting between restraints during the launch phase. The conventional approach employs honeycomb material on the order of one inch in thickness for large arrays. No supplemental structure except for the deployment mechanism is required after deployment in orbit.

In order that an array with a large surface area may be stored within the confines of the launch vehicle shroud, multiple hinging of separate substrate panels is frequently employed. In such a concept, the several substrate panels with hinges between each panel are folded in accordion pleated fashion with the panels stacked one on top of the other with the stack extending radially outward of the spacecraft axis corresponding to the launch vehicle. Obviously, the height or radial extent of the stack of these panels becomes an important limitation because of the thickness of the substrate. Either the spacecraft volume is reduced to permit the necessary stack height, or the maximum power available is limited by the spacecraft volume requirements. Further, the panel width must decrease as the panels are stacked radially outward of the spacecraft axis, since the launch vehicle shroud being cylindrical in form must encompass the spacecraft and the separate rigid substrate panels of the solar cell array. Thus, the outermost panels must have a different width than the innermost if the deployment area is to be maximized, while shroud volume consumption is minimized. This not only introduces great complexity in the deployment mechanism, but requires a coordinated deployment sequence involving in most cases a scissors linkage attached to the edges of the substrates. Further, latching devices are required at the hinges between substrate panels and/or the linkage mechanism to rigidize the array, particularly subsequent to deployment.

The nature of any stacked panel solar cell array limits the maximum solar cell area presented for power generation prior to deployment, to one-half of the total area when two panels are used, one-third when three are used, etc.

Further, attempts have been made to place various hinged panel sections about the various sides or faces of the spacecraft body while maintaining the panel sections within the cylindrical volume limits of the launch vehicle shroud and while, at the same time, exposing the complete surface area of the panels prior to deployment. This keeps the deployment mechanism simplified, but these requirements require at least two hinged sub-panels affixed to primary panels if large solar cell surface areas are to be achieved.

Regardless of the nature of mounting the solar cell panel sections to the periphery of the spacecraft body, the rigid substrates, being relatively thick, constrains the maximum area by the fact that each panel element of the array lies on a chord of the circular shroud envelope. In addition, the chordal nature of the panel elements prohibits maximum spacecraft volume from being achieved. The deployed solar cells of the rigid class thus described suffer the inherent inefficiencies because of the discontinuous nature of the substrate. Each of the several separate panels or sections must have a portion of the substrate clear of solar cells around its periphery, about the points of hinge mechanization, and in the regions of the launch support interfaces. This, of course, requires more substrate area and weight than is necessary for the power function alone. In addition every discontinuity in the substrate surface imposes design limitations upon the electrical configuration of the solar cell layout, thus leading to additional inefficiencies. Further, at every hinge line, it is necessary to strap wire across the joint to provide electrical continuity and the system suffers the attendant reliability reduction. The nature of the rigid solar cell panels of the past design require that the necessary power area be achieved in finite increments with each increment the area of one sub-panel or section. For example; if 30 square feet of array is required and a design using two sub-panels is optimized, then each panel must necessarily be 15 square feet in area. Any growth in the requirements may only then be accomplished by adding a third panel having a similar 15 square foot surface area, not likely to be an optimum, or by major redesign of the sub-panels and launch restraint. Similar difficulties exist but perhaps to a more limited degree with the second of the above described type of fixed rigid solar cell panel array.

With respect to the second class of deployable solar cell arrays using the principle of a flexible substrate, the flexible substrate solar cell arrays are characterized by a "paper thin" substrate to which the solar cells are mechanically affixed. The negligible stiffness of this assembly requires special packaging to survive launch vibrations in a mechanized structure, to which the solar array is attached, for deployment and to provide sufficient structural stiffness in the deployed state. Solar cell arrays of this class are preferred over rigid substrate arrays, at higher power levels where they become weight competitive or superior and/or where the absolute power requirement (deployed area) exceeds that which can be realistically achieved with the simpler rigid substrate array. The substantial mechanical complexity of these arrays and the more severe transient temperatures (due to low thermal mass) suffered in orbit is generally believed to make them less reliable and more expensive than rigid arrays.

The present invention is directed to the solving of the problems inherent to conventional rigid substrate solar cell and flexible substrate solar cell arrays.

SUMMARY OF THE INVENTION

The present invention is directed to a deployable solar cell array which employs a continuous, elastically deformable, semi-rigid panel which is nominally flat when deployed and elastically deformed and wrapped about the spacecraft body during vehicle launch.

Specifically, at least one solar cell panel is curved into arcuate form to conform the panel to the spacecraft body and/or launch vehicle envelope and is coupled to the body by releasable restraint means. The spacecraft includes deployment means for each panel in the form of a deployment arm hinged at its ends respectively to the spacecraft body and to the panel. Spring biased hinges couple the deployment arm at one end to the center of the body and at the other end to an edge of its panel to automatically deploy the panel radially outward of the body and at some distance therefrom in response to release of the restraint means. A motor mounted on the spacecraft body and coupled to the inboard end of each deployment arm is preferably employed to rotate each deployed panel about the axis of the deployment arm to align the solar cells with the solar radiation. Preferably, a pair of semi-rigid solar cell panels are wrapped about opposite sides of the spacecraft body with edges of respective panels in confronting position and commonly latched at their opposed edges under elastically deformed restraint, each panel being mounted on its deployment arm.

BRIEF DESCRIPTION OF THE DRAWINGS

FIG. 1 is a perspective view of a spacecraft incorporating the self-deployable, elastically deformable, semi-rigid multiple panel solar cell array of the present invention, with the panels elastically deformed and wrapped about the exterior of the spacecraft.

FIG. 2 is a perspective view of the spacecraft, similar to that of FIG. 1, with the ends of the panels released from the spacecraft and tangent thereto prior to full panel deployment.

FIG. 3 is a perspective view of the spacecraft, similar to that of FIGS. 1 and 2, with the paired semi-rigid panels in fully deployed position.

FIG. 4 is a side elevational view of a portion of the spacecraft of FIG. 2 corresponding to conditions of FIG. 2.

FIG. 5 is a side elevational view of a portion of the spacecraft similar to that of FIG. 4 with a panel in fully deployed position.

FIG. 6 is an end view of a portion of the spacecraft showing the deployment mechanism under conditions corresponding to those of FIGS. 3 and 5.

FIG. 7 is an enlarged end view, partially in section, of the portion of the spacecraft of FIG. 6.

FIG. 8 is an enlarged side view, partially in section, of that portion of the spacecraft of FIG. 7.

FIG. 9 is an enlarged side view, partially in section, of the hinge construction of a deployment arm of FIG. 4 to its panel.

DESCRIPTION OF THE PREFERRED EMBODIMENT

The illustrated embodiment of the invention involves the utilization of a spacecraft indicated generally at 10 in which the spacecraft body 12 is of modified cylindrical configuration conforming partially to the circular configuration of the launch vehicle shroud (not shown) and having a diameter generally corresponding thereto. In this respect, the spacecraft body 12 is provided with opposed flattened outer walls nominally identified as an upper wall 14 and a lower wall 16 when the spacecraft is oriented as shown in FIG. 1. Alternatively, the spacecraft 12 may be a true cylinder. However, in this case, upper and lower arcuate lattice supports or frameworks 18 are provided on walls 14 and 16 for physically supporting opposed solar cell panels indicated generally at 20 and 22, the panels 20 and 22 constituting the major elements of the present invention. Arcuate sidewalls 24 of the spacecraft body 12 form an enclosure along with opposed end walls 26 and upper and lower walls 14 and 16 respectively. The lattice supports or frameworks 18 have a radius of curvature conforming to that of the sidewalls 24 and act essentially as extensions thereof, these members 18 being formed of tubular metal material and mounted to the top and bottom walls 14 and 16 by suitable mounting pins 28. The purpose of the lattice supports or framework 18 is to provide a curved surface acting as a continuation of the sidewalls 24 about which panels 20 and 22 are wrapped and constrained during vehicle launch. The solar panels 20 and 22 are made up of a continuous semi-rigid elastically deformable substrate 30 of conventional light weight metal honeycomb construction; being rectangular in configuration and having a length L on the order of the axial length of the spacecraft 12 and a width W in excess of the diameter or width of the spacecraft 12. The substrate may, for example, be formed of an aluminum sandwich having a thickness approximately 0.25 inches as example (3 mil skins; three-sixteenths cell 2.0 pounds per cubic foot density core) based on a spacecraft configuration requiring a storage radius of curvature of approximately 50 inches for each panel 20 and 22. Thin solar cells 32 form an array mounted to the radially outer surface of each panel; the make up of the solar cells being quite conventional and forming a very thin outer layer for panels 20 and 22. The electrical connections and the like between individual cells and between the panels 20 and 22 and the interior of the spacecraft body 12 are purposely not shown, as they are quite conventional.

In the illustrated embodiment, the pair of panels 20 and 22 are mounted to opposite faces of the spacecraft opposing in this case the upper and lower walls 14 and 16 of the spacecraft body 12. Alternatively, a single panel could be employed which could be wrapped completely about the periphery of the spacecraft body 12 with the ends of the panel facing each other, however, in the illustrated embodiment, edges 34-36 of the upper panel 20 face edges 38 and 40, respectively, of the lower panel 22 when the panels are elastically deformed and circularly wrapped about the spacecraft body 12. In order to maintain the panels, by way of the elastically deformed substrates 30, wrapped about the spacecraft body 12, the illustrated embodiment of the invention incorporates a plurality of simple, rotatable T latches 42 mounted in line with each other and the axis of the spacecraft on the arcuate end walls 24 of the spacecraft body. The latches 42 include elongated heads 44 rotatable 90° such that the opposite ends of the heads 44 of the latches overlie the confronting edges of the respective panels as seen in contrasting FIGS. 1 and 2. The manner of restraining the panels under elastically deformed conditions is illustrative only of one approach. For instance, it is contemplated that panel tie-down and release may be accomplished by a continuously extending tie-down element integral with a zip cord release, or that the rotatable latches 42 may be replaced by a series of longitudinally spaced pyrotechnic bolts. In any case, subsequent to preloading, that is, elastically deforming the naturally flat panels 20 and 22 into curved configuration from the position shown in FIG. 2 to the position in FIG. 1 by manual or mechanical means, the latches 42 in this instance are rotated such that the elongated heads 44 have their ends overlying the edges of respective panels to maintain the panels in position conforming to the circular configuration of the launch vehicle shroud (not shown) and with the stored energy due to elastic deformation effecting self-return to the flat position at the time of deployment after launch and the reaching by the launch vehicle spacecraft at the appropriate altitude.

Each lattice support 18 as seen in FIG. 3 is formed to include a slot 46 extending longitudinally inwardly from one end of the spacecraft 12 and past the center thereof. A deployment arm indicated generally at 50 is pivotably mounted at one end 68 to the spacecraft body 12 and at the opposite end 74 to an edge of a respective panel to permit proper deployment of its panels 20 or 22 to a position at right angles to the vehicle axis with the solar cells 32 on the outboard surface of the same oriented towards the source of solar energy. In the illustrated embodiment, in FIG. 3, the solar cells 32 face to the left and lie generally coplanar to the left hand end wall 26 of the spacecraft 12. Mounted within the center of the upper and lower walls 14 and 16 of spacecraft 12 is a deployment arm drive motor 52. The motor, in FIG. 6, is mounted within a circular opening 54 within the top wall 14, the motor 52 being provided with a flange 56 which is bolted to the top wall 14 of the spacecraft by suitable bolts 58. Extending upwardly, FIG. 6, from the motor 52 is a rotatable bracket 60 including a base plate 62 supporting laterally spaced ears 64 through which extends a pivot pin 66 mounted for rotation therein, the pin being rigidly coupled to the lower or radially inboard end 68 of the deployment arm 50 forming a spring biased hinge 70. A coil spring 65 is concentrically mounted on pin 66 and has one end 67 fixed thereto and the other end 69 fixed to ear 64 and is tensioned to pivot the deployment arm 50 from the position shown in FIG. 4 to the position shown in FIGS. 3, 5 and 6. Bracket 60 includes a recessed portion 59 between ears 64 defining stops 61 and 63 for deployment arm 50, limiting rotation of arm 50 about pin 66 to an angle θ of somewhat less than 90°, FIG. 8. Further, on the opposite side of the pin 66 from spring 65 is a switch member 72 responsive to rotation of the arm and deployment of the panel to provide an electrical signal indicative of pivoting of the deployment arm 50 from a position essentially parallel to the surface of the top wall 14 of the spacecraft to a position at right angles thereto. A similar spring biased hinge 76 is provided between the outboard end 74 of the deployment arm 50 and side edge 78 of panel 20. In this respect, the outboard end 74 of each deployment arm 50 terminates in a generally right angle projection portion 75 fixedly supporting pivot pin 77. A bifurcated hinge element 79 straddles projection 75 and a spring assembly 80 identical to that at the inboard end of arm 50 biases the panel to its radially extended position as shown in FIG. 3. In FIG. 9, face 82 of hinge element 79 defines a stop which abuts edge 84 of projection 75 when the panel 20 fixed thereto overlies upper wall 14 of the spacecraft, FIG. 4, and which abuts edge 86 of the projection 75 when the panel 20 is fully extended radially of the spacecraft, FIG. 5. The spring loaded hinges 70 and 76 automatically bias the panels 20 and 22 to the positions of FIG. 3 upon release of the panel ends by rotation of latches 42. The hinge 76 further preferably carries a second switch 90 responsive to pivoting of the panel 20 approximately 180° relative to said arm 50 from a position where the panel overlies the arm 50 and is coplanar therewith as seen in FIG. 4 to a position where it extends outwardly therefrom as an axial extension thereof and also generally coplanar therewith, the extent of this movement being seen by comparison of FIGS. 4 and 5. Further, since the spring loaded hinges 70 and 76 are provided with latches, they retain the deployment arms in the radial position shown in FIGS. 3, 5 and 6, and the panels in their outboard position with respect to the deployment arm 50 as seen in FIG. 5. Alternatively, and in a more sophisticated type of control system, pivoting of the inboard end 68 of the deployment arms 50 may be accomplished by a drive motor, and a Selysen motor system may be employed for effecting rotation of the panel 20 about the hinge joint 76 at edge 78 proportional to pivoting of the inboard end to radial position relative to the spacecraft 12.

Further, while the invention has been described in conjunction with the use of the lattice supports 18 as curved guide surfaces for facilitating the elastic deformation of panels 20 and 22, such supports may not be necessary to control and maintain prescribed curvature of the individual panels 20 partially due to the additional stiffness developed by curving of the substrates 30 to the extent of an adequate natural frequency as determined by launch requirements.

By elastically deforming and wrapping a single panel or multiple panels about the spacecraft body, the continuous substrate permits the broadest lattitude in solar cell configuration, substrate area is more efficiently used because there is a minimum of area prohibited to solar cell placement. As the substrate's perimeter length is markedly reduced, there is no mechanical infringing on the substrate face and all launch supports and restraints can be accommodated on the reverse side of the substrate. The panel or panels when elastically deformed for launch may have a radius of curvature equal to that of the dynamic envelope of the launch vehicle shroud, and this maximizes and therefore substantially increases the possible substrate area available for power production prior to array deployment in contrast to the previously described concepts which stow the substrate as chordal planes within the cylindrical envelope. The stowed configuration of the invention of the panels of the present invention allows maximum spacecraft volume to be achieved as an intrusion on the spacecraft design envelope is negligible when compared to that of the conventional concepts described in the description of the prior art. The curvature induced in the substrate 30 of each panel when stowed for launch enhances the structural stiffness of the substrate. This allows a thinner substrate to be used with consequent weight savings. The invention further eliminates the need for hinges between substrate sections or panel sections, thus increasing reliability and producing further weight savings.

Further, while the solar array panel support structure above the north and south equipment panels (upper and lower spacecraft body walls 14–16) comprises an open framework or lattice structure 18 composed of rectangular tubular members and the solar array supports structure on the east and west sides 24 of the spacecraft, because each panel is stowed with a constant radius of curvature, uniform moment is induced and this moment is reacted at the panel ends by way of the multiple rotatable latches 42, the forces acting through the elongated heads 44 on the edges of respective panels. Further, the stress produced in the solar cells 32 and their covers (not shown) due to curving of the panels 20 and 22 for storage must be resolved, it is preferred that the cell cover and cell-substrate interface bond be formed or RTV, a flexible material with the induced stresses being lower than if the elements were rigidly bonded.

While the solar array panels are illustrated in rectangular configuration, the present invention permits relatively broad design lattitude both in terms of area selection, size and configuraton. The array therefore with its area defined by a particular spacecraft's power system need, may be optimized at that size. Reductions or increase in area requirements can be accommodated by reducing or increasing the panel size by whatever actual area increment is necessary without influence on the array's weight efficiency and negligible impact on the spacecraft design as compared to the prior rigid panel structures. Alternatively, rather than employing a honeycomb substrate, the panels may be formed of a matrix type structure with a thin overlay of Kapton sheeting to which the individual solar cells 32 may be affixed.

While the invention has been particularly shown and described with reference to a preferred embodiment thereof, it will be understood by those skilled in the art that various changes in form and details may be made therein without departing from the spirit and scope of the invention.

What is claimed is:

1. In a spacecraft including a spacecraft body having a longitudinal axis and having at least one solar cell panel carried by said body and deployment means coupling said at least one panel to said body and operable to deploy said at least one panel radially outward of said body after spacecraft launch, the improvement wherein:

each said solar panel comprises a continuous, elastically deformable semi-rigid, normally flat substrate and has a width in excess of the diameter of the spacecraft body, and said spacecraft includes releasable latching means for restraining said at least one solar panel substrate elastically, arcuately deformed and curved about the spacecraft longitudinal axis, in contact with the body exterior during vehicle spacecraft launch, said substrate returning to a substantially flat configuration solely due to the elastic property of said substrate upon release operation of said releasable means.

2. The spacecraft as claimed in claim 1, wherein said deployment means comprises a deployment arm and means for hinge connecting said arm at its ends respectively to said body and to said at least one panel, whereby in response to release of said latching means and flattening of said elastically deformable semi-rigid substrate, pivoting of said deployment arm effects movement of said at least one panel radially outwards of said spacecraft body to a position such that said at least one panel is at right angles to the longitudinal axis of the spacecraft body.

3. The spacecraft as claimed in claim 2, wherein said spacecraft body is cylindrical in form, said at least one panel is of a length approximating the axial length of said spacecraft body and said deployment arm is of a length approximately one-half the length of said at least one solar cell panel and is hinged at one end to the edge of said at least one panel and at the other end to the center of said body such that when said at least one panel substrate is releasably latched to said body and elastically, deformably, curved to conform thereto, said deployment arm extends parallel to the longitudinal axis of the body between the periphery of the cylindrical spacecraft body and the surface of said at least one solar panel facing the periphery of the spacecraft body.

4. The spacecraft as claimed in claim 3, wherein said means for hinge connecting said deployment arm to said spacecraft body comprises a first spring biased hinge and said means for hinge connecting said deployment arm to said at least one panel comprises a second spring biased hinge mounted on said edge of said at least one panel, said first hinge includes integral stop means limiting hinge movement of the hinge means coupling said arm to said spacecraft body to 90° and said second hinge includes integral stop means limiting movement of said hinge means coupling said arm to said at least one panel to 180° with said spring biased hinges automatically causing said deployment arm to pivot to full radially extended position with respect to said spacecraft and said at least one panel to pivot 180° with respect to said arm to a position where said at least one panel constitutes a radial extension of said deployment arm.

5. The spacecraft as claimed in claim 1, wherein said spacecraft body comprises a cylindrical body, said at least one solar cell panel comprises a pair of solar cell panels of rectangular configuration mounted to opposite sides of said spacecraft body such that under elastic deformation of said panels, the edges of respective panels oppose each other, and said releasable latching means comprise means carried on the periphery of said spacecraft body for commonly latching said opposed edges of respective panels to said spacecraft body.

6. The spacecraft as claimed in claim 2, wherein said spacecraft body comprises a cylindrical body, said at least one solar cell panel comprises a pair of solar cell panels of rectangular configuration mounted to opposite sides of said spacecraft body such that under elastic deformation of said panel substrates, the edges of respective panels oppose each other, and said releasable latching means comprise means carried on the periphery of said spacecraft body for commonly latching said opposed edges of respective panels to said spacecraft body.

7. The spacecraft as claimed in claim 3, wherein said at least one solar cell panel comprises a pair of solar cell panels of rectangular configuration mounted to opposite sides of said spacecraft body such that under elastic deformation of said panel substrates, the edges of respective panels oppose each other, and said releasable latching means comprise means carried on the periphery of said spacecraft body for commonly latching said opposed edges of respective panels to said spacecraft body.

8. The spacecraft as claimed in claim 4, wherein said at least one solar cell panel comprises a pair of solar cell panels of rectangular configuration mounted to opposite sides of said spacecraft body such that under elastic deformation of said panel substrates, the edges of respective panels oppose each other, and said releasable latching means comprise means carried on the periphery of said spacecraft body for commonly latching said opposed edges of respective panels to said spacecraft body.

9. The spacecraft as claimed in claim 5, wherein said releasable latching means comprises a plurality of longitudinally spaced, T-shaped, rotatable latch members mounted on the periphery of the spacecraft body for rotation about their bases and about an axis radial of said spacecraft body and having heads elongated which upon pivoting overlie said respective opposed edges of said deformable panels.

10. The spacecraft as claimed in claim 8, wherein said releasable latching means comprises a plurality of longitudinally spaced, T-shaped, rotatable latch members mounted on the periphery of the spacecraft body for rotation about their bases and about an axis radial of said spacecraft body and having heads elongated which upon pivoting overlie said respective opposed edges of said deformable panels.

* * * * *

UNITED STATES PATENT AND TRADEMARK OFFICE
CERTIFICATE OF CORRECTION

PATENT NO. : 4,133,501
DATED : Jan. 9, 1979
INVENTOR(S) : Chester J. Pentlicki

It is certified that error appears in the above-identified patent and that said Letters Patent are hereby corrected as shown below:

Column 6, line 44, change [intrustion] to --- intrusion ---

Column 7, line 1, change [or] to --- of ----

Column 8, line 8, after "mounted" delete [on] and
　　　insert ---- to ----

Signed and Sealed this

Eighth Day of May 1979

[SEAL]

Attest:

RUTH C. MASON
*Attesting Officer*

DONALD W. BANNER
*Commissioner of Patents and Trademarks*